(12) United States Patent
Mishra et al.

(10) Patent No.: US 12,461,834 B2
(45) Date of Patent: Nov. 4, 2025

(54) HEALTH CHECK FOR PRIMARY FAILOVER

(71) Applicant: Rakuten Symphony, Inc., Tokyo (JP)

(72) Inventors: Ashok Kumar Mishra, San Jose, CA (US); Ramendra Pratap Singh, Bangalore (IN); Sree Nandan Atur, Newark, CA (US)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/249,793

(22) PCT Filed: Dec. 8, 2022

(86) PCT No.: PCT/US2022/052281
§ 371 (c)(1),
(2) Date: Apr. 20, 2023

(87) PCT Pub. No.: WO2024/123339
PCT Pub. Date: Jun. 13, 2024

(65) Prior Publication Data
US 2025/0291687 A1    Sep. 18, 2025

(51) Int. Cl.
*G06F 11/20* (2006.01)
(52) U.S. Cl.
CPC ...... *G06F 11/2094* (2013.01); *G06F 2201/80* (2013.01)
(58) Field of Classification Search
CPC .......................... G06F 11/2094; G06F 11/2056
USPC .................................................. 714/6.3, 4.11
See application file for complete search history.

(56) References Cited

U.S. PATENT DOCUMENTS

| | | | |
|---|---|---|---|
| 8,988,983 | B1 | 3/2015 | Brandwine |
| 9,009,542 | B1 | 4/2015 | Marr |
| 9,280,390 | B2 | 3/2016 | Sirota |
| 10,127,097 | B2 | 11/2018 | Talla |
| 10,133,619 | B1 | 11/2018 | Nagpal |
| 10,320,891 | B2 | 6/2019 | Agarwal |
| 10,558,536 | B2 | 2/2020 | Ngo |
| 11,425,194 | B1 | 8/2022 | Khanna |
| 2011/0116362 | A1 | 5/2011 | Singatwaria |
| 2018/0260291 | A1 | 9/2018 | Misra et al. |
| 2021/0011797 | A1* | 1/2021 | Robison ............ G06F 11/0793 |

(Continued)

OTHER PUBLICATIONS

Bourtembourg et al.; "Pushing the Limits of Tango Archiving System Using PostgreSQL and Time Series Databases" 2019 (2019) [online], [retrieved on Feb. 20, 2023]. Retrieved from the Internet <URL: https://epaper.kek.jp/icalepcs2019/papers/wepha020.pdf>, entire document, especially p. 3, col. 1, para 2 and p. 3, col. 2, para 4.

*Primary Examiner* — Chae M Ko
(74) *Attorney, Agent, or Firm* — David R. Stevens; Stevens Law Group

(57) ABSTRACT

A primary database and one or more secondary databases are managed by a redundancy manager, e.g., PATRONI, that manages failover to one of the secondary databases upon failure of the primary database. A separate orchestrator monitors status of the host of the primary database and monitors values such as loading, latency, temperature, and/or trends in these values. Upon detecting that the values indicate a risk of failure of the host, the orchestrator preemptively instructs the redundancy manager to perform failover to one of the secondary databases.

20 Claims, 5 Drawing Sheets

(56) References Cited

U.S. PATENT DOCUMENTS

| | | |
|---|---|---|
| 2022/0092032 A1 | 3/2022 | Vijayan et al. |
| 2022/0164266 A1* | 5/2022 | Butucea Panait ..... G06F 16/273 |
| 2022/0188184 A1* | 6/2022 | Robison .............. G06F 11/0757 |

* cited by examiner

HEALTH CHECK FOR PRIMARY FAILOVER

BACKGROUND

Field of the Invention

This invention relates to performing a health check for primary failover.

Background of the Invention

Many computing applications require persistent storage in the form of databases implemented using database software such as SQL, POSTGRESQL, or the like. The persistent storage will be implemented on a storage device such as a hard disk drive, solid state drive, or the like coupled to a host computing device. Many computing applications require high availability of databases. Accordingly, failure of a storage device or host computing device can be catastrophic.

It would be an advancement in the art to improve the resilience of databases to failure.

SUMMARY OF THE INVENTION

An apparatus includes a plurality of computing devices each comprising one or more processing devices and one or more memory devices operably coupled to the one or more processing devices. The plurality of computing devices are configured to implement a plurality of databases on a plurality of host computing devices of the plurality of computing devices. A redundancy manager is configured to select a primary database from the plurality of databases with a remainder of the plurality of databases being secondary databases. The redundancy manger is configured to manage failover upon failure of the primary database. The primary database is monitored independently from the redundancy manager and the redundancy manager may be instructed to preemptively failover to one of the secondary databases prior to failure of the primary database when a risk of failure is detected.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
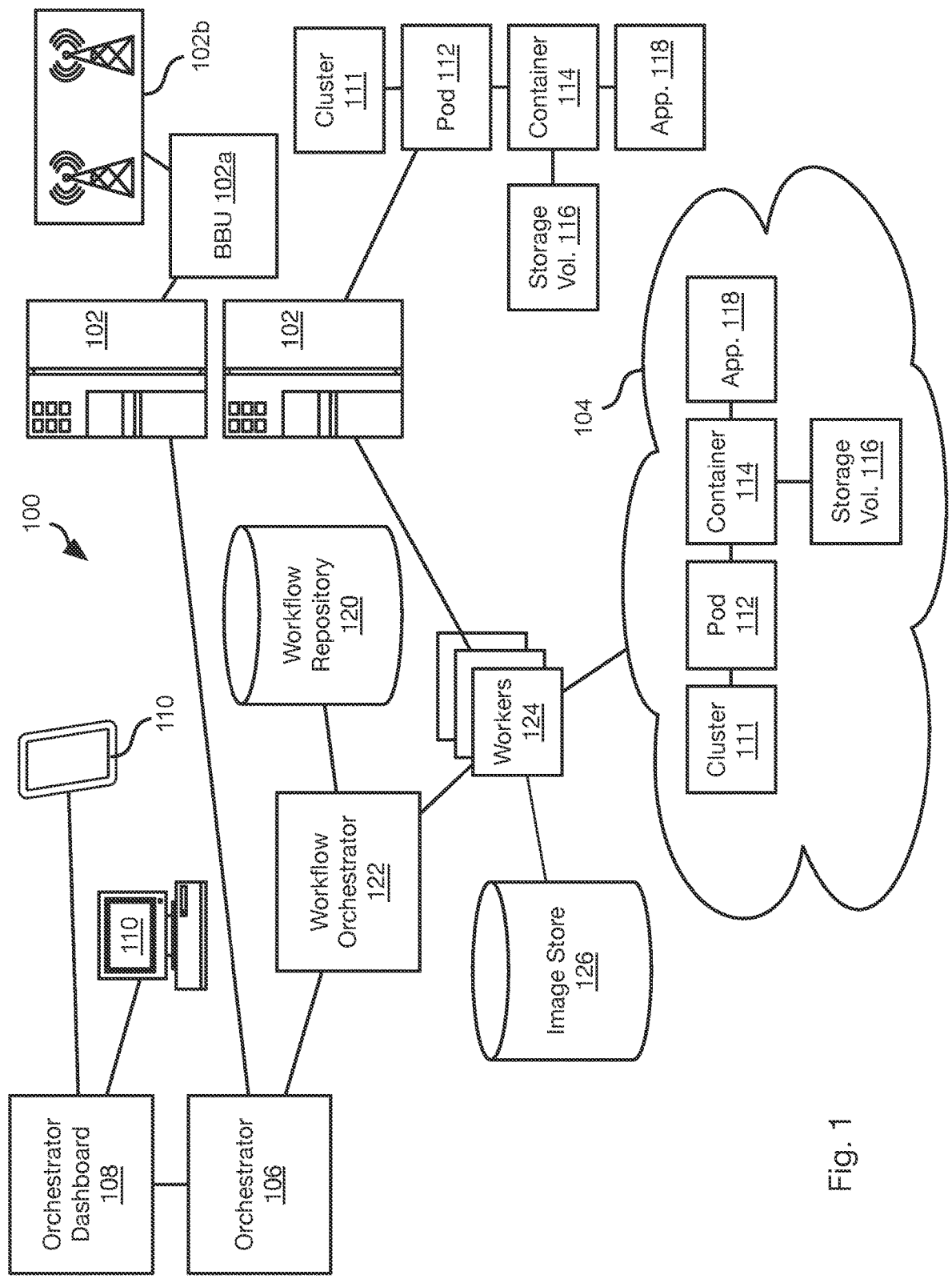
FIG. 1 is a schematic block diagram of a network environment in which databases may be deployed in accordance with an embodiment.

FIG. 1 illustrates an example network environment 100 in which the systems and methods disclosed herein may be used. The components of the network environment 100 may be connected to one another by a network such as a local area network (LAN), wide area network (WAN), the Internet, a backplane of a chassis, or other type of network. The components of the network environment 100 may be connected by wired or wireless network connections. The network environment 100 includes a plurality of servers 102. Each of the servers 102 may include one or more computing devices, such as a computing device having some or all of the attributes of the computing device 500 of FIG. 5.

Computing resources may also be allocated and utilized within a cloud computing platform 104, such as amazon web services (AWS), GOOGLE CLOUD, AZURE, or other cloud computing platform. Cloud computing resources may include purchased physical storage, processor time, memory, and/or networking bandwidth in units designated by the provider by the cloud computing platform.

In some embodiments, some or all of the servers 102 may function as edge servers in a telecommunication network. For example, some or all of the servers 102 may be coupled to baseband units (BBU) 102*a* that provide translation between radio frequency signals output and received by antennas 102*b* and digital data transmitted and received by the servers 102. For example, each BBU 102*a* may perform this translation according to a cellular wireless data protocol (e.g., 4G, 5G, etc.). Servers 102 that function as edge servers may have limited computational resources or may be heavily loaded.

An orchestrator 106 provisions computing resources to application instances 118 of one or more different application executables, such as according to a manifest that defines requirements of computing resources for each application instance. The manifest may define dynamic requirements defining the scaling up or scaling down of a number of application instances 118 and corresponding computing resources in response to usage. The orchestrator 106 may include or cooperate with a utility such as KUBERNETES to perform dynamic scaling up and scaling down the number of application instances 118.

An orchestrator 106 may execute on a computer system that is distinct from the servers 102 and is connected to the servers 102 by a network that requires the use of a destination address for communication, such as using a networking including ethernet protocol, internet protocol (IP), Fibre Channel, or other protocol, including any higher-level protocols built on the previously-mentioned protocols, such as user datagram protocol (UDP), transport control protocol (TCP), or the like.

The orchestrator 106 may cooperate with the servers 102 to initialize and configure the servers 102. For example, each server 102 may cooperate with the orchestrator 106 to obtain a gateway address to use for outbound communication and a source address assigned to the server 102 for use in inbound communication. The server 102 may cooperate with the orchestrator 106 to install an operating system on the server 102. For example, the gateway address and source address may be provided and the operating system installed using the approach described in U.S. application Ser. No. 16/903,266, filed Jun. 16, 2020 and entitled AUTOMATED INITIALIZATION OF SERVERS, which is hereby incorporated herein by reference in its entirety.

The orchestrator 106 may be accessible by way of an orchestrator dashboard 108. The orchestrator dashboard 108 may be implemented as a web server or other server-side application that is accessible by way of a browser or client application executing on a user computing device 110, such as a desktop computer, laptop computer, mobile phone, tablet computer, or other computing device.

The orchestrator 106 may cooperate with the servers 102 in order to provision computing resources of the servers 102 and instantiate components of a distributed computing system on the servers 102 and/or on the cloud computing platform 104. For example, the orchestrator 106 may ingest a manifest defining the provisioning of computing resources to, and the instantiation of, components such as a cluster 111, pod 112 (e.g., KUBERNETES pod), container 114 (e.g., DOCKER container), storage volume 116, and an application instance 118. The orchestrator may then allocate computing resources and instantiate the components according to the manifest.

The manifest may define requirements such as network latency requirements, affinity requirements (same node, same chassis, same rack, same data center, same cloud region, etc.), anti-affinity requirements (different node, different chassis, different rack, different data center, different cloud region, etc.), as well as minimum provisioning requirements (number of cores, amount of memory, etc.), performance or quality of service (QOS) requirements, or other constraints. The orchestrator 106 may therefore provision computing resources in order to satisfy or approximately satisfy the requirements of the manifest.

The instantiation of components and the management of the components may be implemented by means of workflows. A workflow is a series of tasks, executables, configuration, parameters, and other computing functions that are predefined and stored in a workflow repository 120. A workflow may be defined to instantiate each type of component (cluster 111, pod 112, container 114, storage volume 116, application instance, etc.), monitor the performance of each type of component, repair each type of component, upgrade each type of component, replace each type of component, copy (snapshot, backup, etc.) and restore from a copy each type of component, and other tasks. Some or all of the tasks performed by a workflow may be implemented using KUBERNETES or other utility for performing some or all of the tasks.

The orchestrator 106 may instruct a workflow orchestrator 122 to perform a task with respect to a component. In response, the workflow orchestrator 122 retrieves the workflow from the workflow repository 120 corresponding to the task (e.g., the type of task (instantiate, monitor, upgrade, replace, copy, restore, etc.) and the type of component. The workflow orchestrator 122 then selects a worker 124 from a worker pool and instructs the worker 124 to implement the workflow with respect to a server 102 or the cloud computing platform 104. The instruction from the orchestrator 106 may specify a particular server 102, cloud region or cloud provider, or other location for performing the workflow. The worker 124, which may be a container, then implements the functions of the workflow with respect to the location instructed by the orchestrator 106. In some implementations, the worker 124 may also perform the tasks of retrieving a workflow from the workflow repository 120 as instructed by the workflow orchestrator 122. The workflow orchestrator 122 and/or the workers 124 may retrieve executable images for instantiating components from an image store 126.

Figure 2:
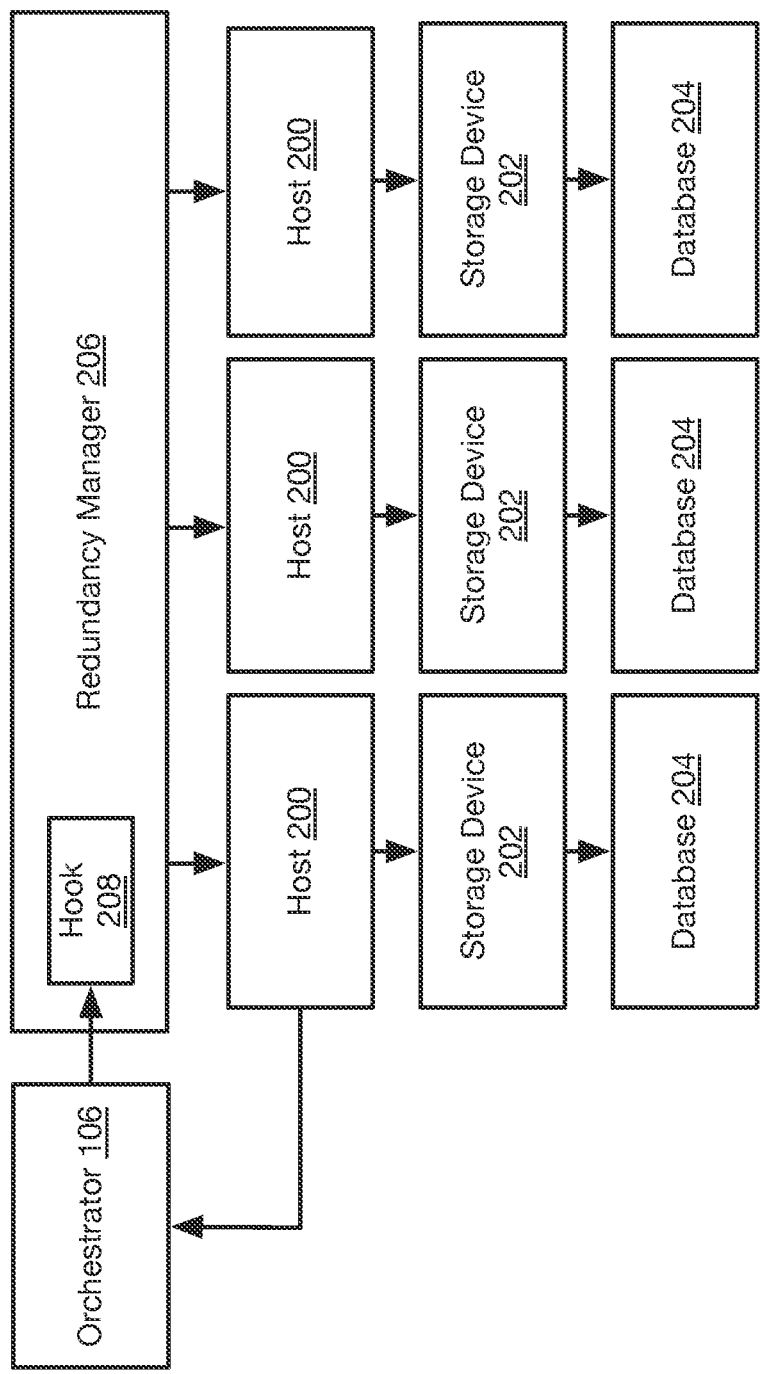
FIG. 2 is a schematic block diagram showing components for implementing redundant databases and performing failover in accordance with an embodiment.

Referring to FIG. 2, a database host 200 may be a server 102, a unit of computing resources on the cloud computing platform 104, a virtual machine, or other computing device. A database host 200 may have one or more storage devices 202 mounted thereto. Each storage device 202 may be implemented as a hard disc drive (HDD), solid state drive (SSD), or other type of persistent storage device. A storage device 202 may be physically mounted to a host 200 or may be coupled to the host 200 by a network.

A storage device 202 may host one or more databases 204, e.g., a storage volume 116 storing a database. Multiple application instances 118 may access the database 204 in order to write data to the database 204 and execute queries with respect to the database 204. For example, the databases 204 may be POSTGRESQL databases.

The databases 204 may be redundant with respect to one another with one database 204 acting as a primary database and the remaining databases 204 acting as secondary databases. All changes to the primary database may be propagated to the secondary databases. For example, a write operation may not be acknowledged as complete until the data from the write operation has been written to the primary database and at least one secondary database, or all secondary databases in some embodiments.

A redundancy manager 206 may manage the implementation of redundancy across the hosts 200 and the databases 204. For example, the redundancy manager 206 may execute PATRONI. The redundancy manager 206 may manage maintaining secondary databases current with respect to the primary database. The redundancy manager 206 may manage the selection of one of the databases 204 to act as the primary database. The redundancy manger 206 may further manage failover to a secondary database in response to failure of the primary database.

In accordance with the methods disclosed herein, the orchestrator 106 may perform various actions to preempt or enhance the functions of the redundancy manager 206. As such, the redundancy manager 206 may implement a hook 208, such as an application programming interface (API) or other type of interface that may be called by the orchestrator 106 in order to invoke performance of certain actions by the redundancy manager 206 as described below. The redundancy manager 206 and software implementing access to the databases 204 on each host 200 may execute within containers 114 and pods 112 instantiated on each host 200.

Figure 3:
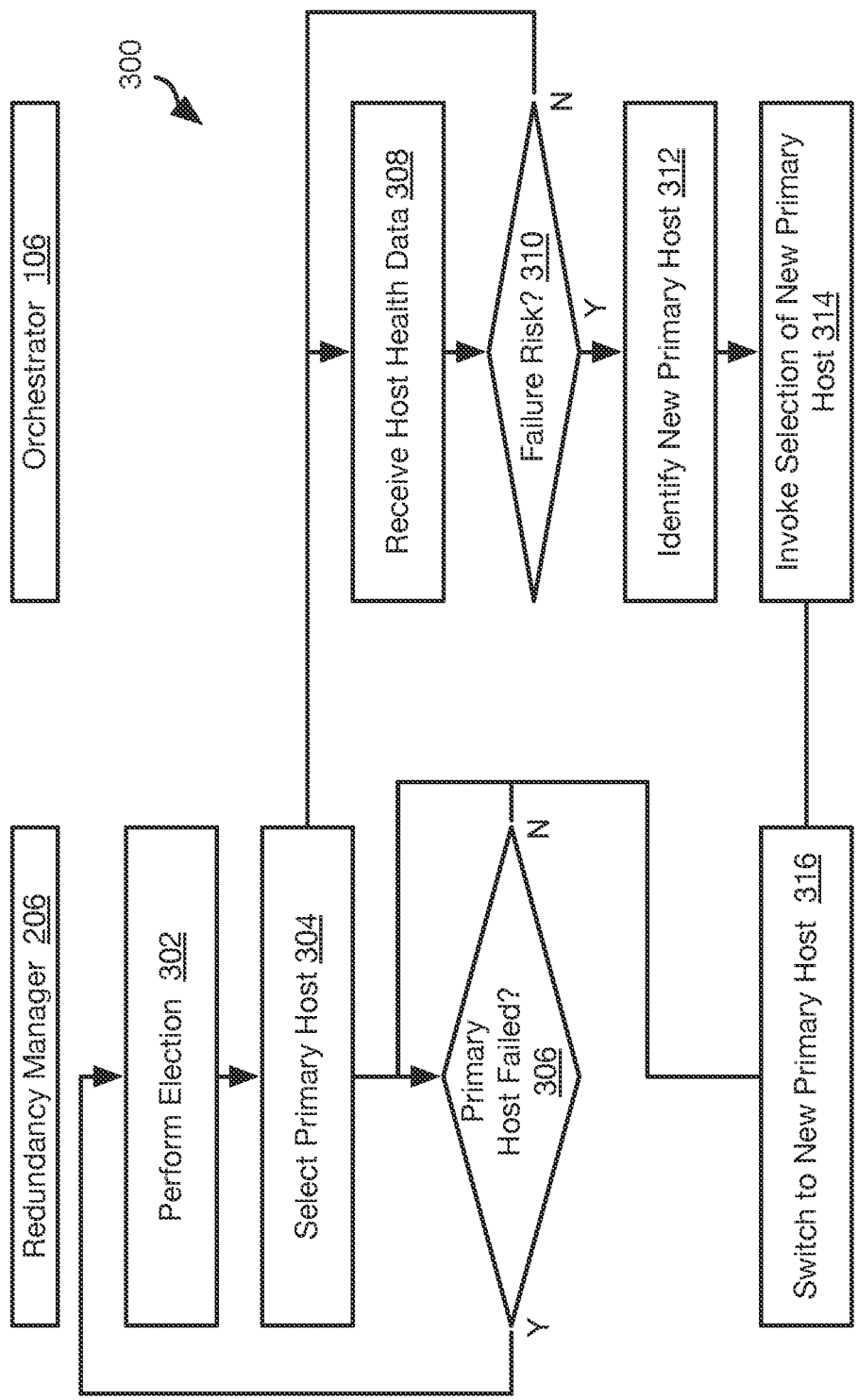
FIG. 3 is process flow diagram of a method for performing failover with redundant databases in accordance with an embodiment.

Referring to FIG. 3, the redundancy manager 206 and orchestrator 106 may execute the illustrated method 300 in order to manage failover from a primary database of the databases 204 to a secondary database in order to maintain high availability of at least one of the databases 204.

The method 300 may include the redundancy manager 206 invoking or performing 302 an election process among the hosts 200 to determine which of the hosts 200 will be initially selected as hosting the primary database of the databases 204. The election process may take into account performance, current status (e.g., loading, temperature, latency, etc.), or other factors or may be performed at random or according to a round robin approach.

A host 200 is selected 304 as the primary host and commences functioning as the primary host by receiving queries with respect to the database 204 hosted by the primary host 200 (i.e., the primary database), writing data to the primary database, and coordinating replication of written data with respect to the databases 204 (i.e., secondary databases) of the other hosts 200 (i.e., secondary hosts). In the event that the primary host is found 306 to have failed, the method 300 may continue at step 302 with the selection of a new primary host from among the remaining hosts 200 other than the failed primary host. Performance of steps 302-306 may be performed using PATRONI or any other approach for performing failover among redundant databases.

The orchestrator 106 may preempt and extend the functionality of the redundancy manager 206 by receiving 308 health data for components including some or all of each host 200, each storage device 202, software implementing each database 204, and any clusters 111, pods 112, containers 114, and application instances 118 implementing the databases 204. Alternatively, health data may be received 308 only for the primary host and software implementing the primary database. Receiving 308 health data for a component may include pulling log data for the component from the host 200 on which the log data is stored. Receiving 308 health data for a component may include requesting performance of a health check by software executing on a host 200 that is the component or that hosts the component or by a workflow from the workflow repository 120. A component may implement an interface for receiving and responding to requests for health data such that receiving 308 health data includes communicating with the component through the interface.

Health data for a host 200 may include data describing a state of hardware of the host 200, such as a temperature of one or more processing devices of the host 200, a loading (e.g., percent of cycles used) for one or more processing devices of the host 200, a temperature of a storage device 202 of the host 200, and a latency of the storage device 202 of the host 200. Health data for a database 204 may include loading (data returned per unit time, requests per unit time, amount of data requested per unit time), latency for responses to requests, or other data. Health data may include health data for an operating system, cluster 111, pod 112, container 114, or other software component executing on the host 200.

The orchestrator 106 may evaluate 310 whether the primary database is at risk of failure, e.g., failure of the host 200, storage device 202, software implementing the primary database, container 114 hosting the software, pod 112 hosting the container 114, cluster hosting the container 114, or other component on the host 200 that is necessary for proper functioning of the primary database. An example approach for evaluating 310 failure risk is described below with respect to FIG. 4.

If the primary database is found 310 to be at risk of failure, the method 300 may include identifying 312 a new host 200 of the primary database from among the secondary hosts of the secondary databases. The new host 200 may be identified based on various factors. For example, the new hosts 200 may be selected as being least likely to fail according to the health data received at step 308. For example, the evaluation of step 310 may be performed with respect to each host 200 and the secondary host that is at the least risk of failure according to the evaluation may be selected as the new primary host 200 of the primary database.

The orchestrator 106 may then invoke 314 selection of the new host 200 identified at step 312 as the primary host of the primary database. For example, using the hook 208, the orchestrator 106 may instruct the redundancy manager 206 to select the new host 200 as the host of the primary database in bypass of the election process of step 302.

In response to the instruction, the redundancy manager 206 switches 316 to the new host 200 as the primary host and any remaining hosts 200 function as secondary hosts, including the former primary host if the former primary host remains in operation.

The method 300 may continue at step 308 with continued receiving 308 of health data. In the event that host 200 that is currently the primary host fails without preemptive detection by the orchestrator 106, the redundancy manager may perform failover according to steps 302-306 as described above.

Figure 4:
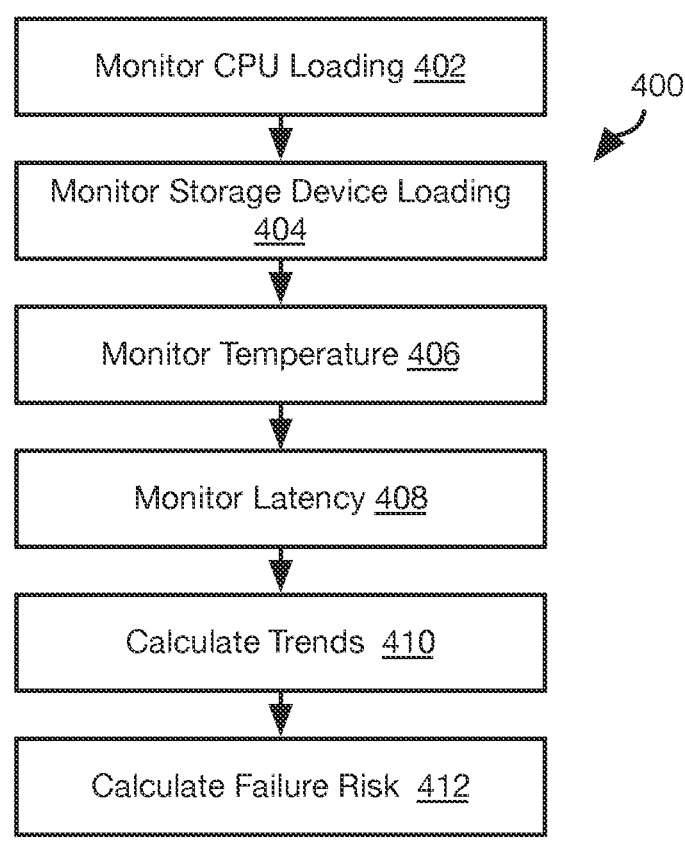
FIG. 4 is a process flow diagram of a method for predicting failure of a device in accordance with an embodiment.

FIG. 4 illustrates a method 400 for evaluating the risk of failure of a host 200. The method 400 may include monitoring 402 CPU loading. Monitoring 402 CPU loading may include obtaining an aggregate CPU loading of multiple processing cores implementing the database 204 of the host 200. Monitoring 402 CPU loading may be performed by receiving or retrieving reports of CPU loading gathered by a container 114 or pod 112 executing software implementing the database 204 on the host 200. CPU loading may be gathered directly from an operating system on the host 200. Monitoring 402 CPU loading may be performed periodically or may include retrieving a time series including measurements of CPU loading at a plurality of regularly spaced times.

The method 400 may include monitoring 404 storage device loading of each storage device 202 of the host 200. Storage device loading may be in the form of data read or written per unit time, read and/or write requests per unit time, or some other metric. Monitoring 404 storage device loading may include obtaining an aggregate loading of multiple storage devices 202 of the host 200. Monitoring 404 storage loading may be performed by receiving or retrieving reports of storage device loading gathered by a container 114 or pod 112 executing software implementing the database 204 on the host 200. Storage device loading may be gathered directly from an operating system on the host 200. Monitoring 404 storage device loading may be performed periodically or may include retrieving a time series including measurements of storage device loading at a plurality of regularly spaced times.

The method 400 may include monitoring 406 temperature of the CPUs, storage devices 202, or other hardware component of the host 200. The temperature measurements may likewise be performed at regular intervals or include time series data. The temperature data may be retrieved from a container 114, pod 112, operating system, or other component executing on the host 200.

The method 400 may include monitoring 408 one or more latencies the host 200. Latency measurements may include measurements of latencies of write requests, latencies of queries, latencies of disk reads, latencies of disk writes, latencies of memory reads and writes, and/or latencies for actions performed by any hardware component of the host 200 or software component executing on the host 200. The latency measurements may be performed at regular intervals or include time series data. The latency measurements may be retrieved from a container 114, pod 112, operating system, or other component executing on the host 200.

The monitoring of steps 402, 404, 406, 408 are exemplary only. Any hardware or software component on the host 200 may be monitored in a like manner.

The method 400 may include calculating 410 trends. For example, time series data from any of steps 402-408 may be processed to determine whether the value recorded in the time series data is increasing, a rate of increase (first derivative), changes to the rate of increase (second derivative), or other value. The time series data may be smoothed or otherwise processed prior to calculating 410 trends in the time series data.

The method 400 may include calculating 412 failure risk for the data from steps 402-410. Calculating 412 failure risk may be understood with respect to the following terminology: "type" refers to a component and a type measurement (loading, temperature, latency, trend) for the component and "value" refers to the actual measured value for that component and type of measurement. Accordingly, the result of steps 402-410 may include a time series of values for each type. Each type may have corresponding threshold for the values of that type and/or for derivatives, second derivatives, statistical characterization (e.g., standard deviation, mean, etc.) of the time series of values for that type.

Calculating 412 failure risk may include calculating a score as a function (e.g., sum or weighted sum) of one or more of the following:

A number of types having values exceeding the threshold for those type.

The amount, if any, by which the value of each type exceeds the threshold for each type.

A number of types having first or second derivatives exceeding corresponding thresholds for those type and the first or second derivatives for those type.

A number of types having predicted values exceeding the threshold for those types, the predicted values being obtained using the trends from step 410, curve fitting, or other prediction technique.

These examples for calculating the score to estimate failure risk are exemplary only and the data from some or all of steps 402-412 may be processed in other ways to assess the risk of failure of a host.

The evaluation of step 310 may include comparing the score from step 412 to a risk threshold. If the score exceeds the risk threshold, the host 200 may be deemed at risk of failure. The score from step 412 may also be used to identify 312 a new primary host: the host 200 with the lowest score may be selected at step 312.

Figure 5:
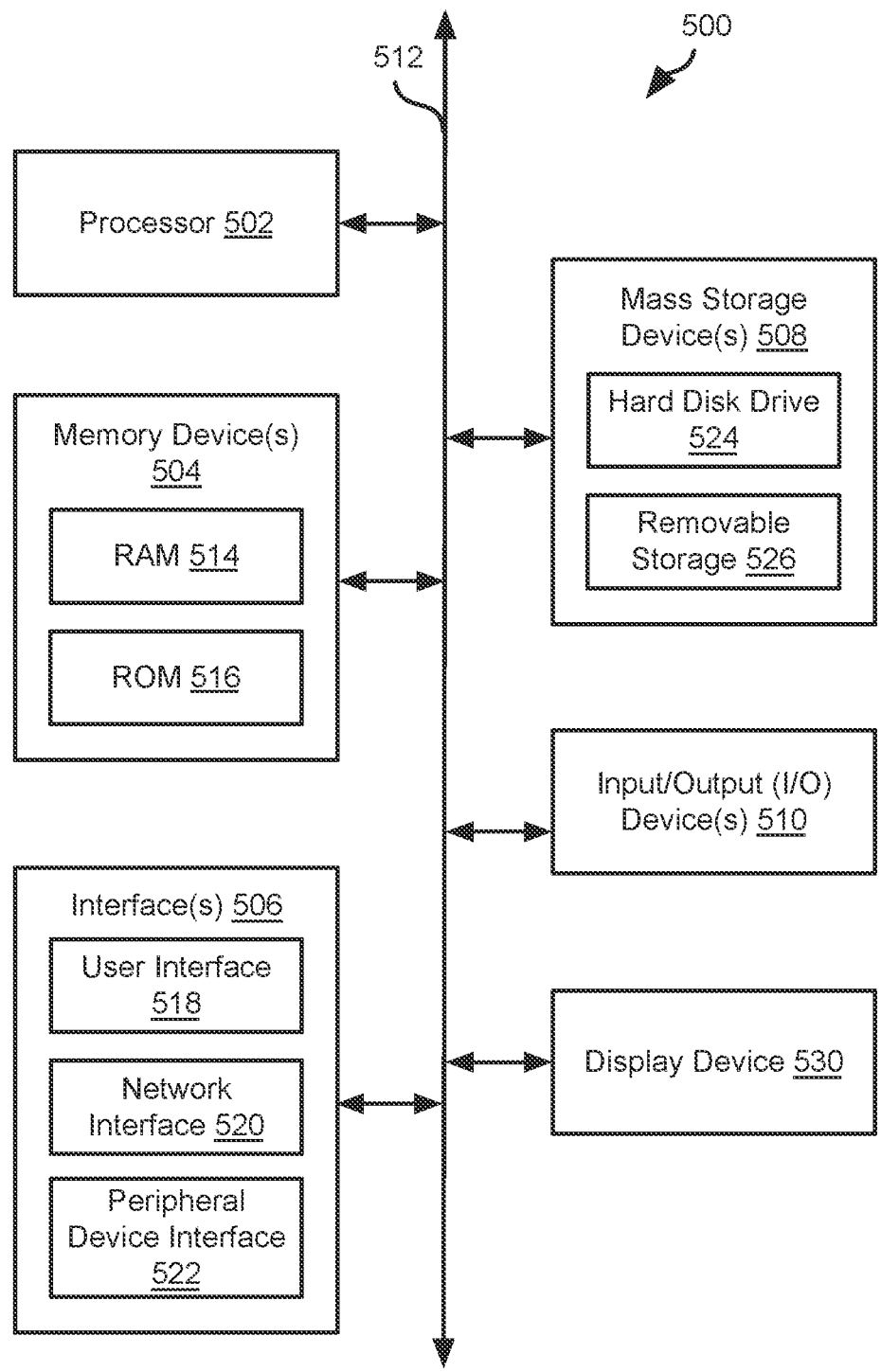
FIG. 5 is a schematic block diagram of an example computing device suitable for implementing methods in accordance with embodiments of the invention.

FIG. 5 is a block diagram illustrating an example computing device 500. Computing device 500 may be used to perform various procedures, such as those discussed herein. The servers 102, orchestrator 106, workflow orchestrator 122, cloud computing platform 104, and redundancy manager 206 may each be implemented using one or more computing devices 500. The orchestrator 106, workflow orchestrator 122, and redundancy manager 206 may be implemented on different computing devices 500 or a single computing device 500 may execute all of the orchestrator 106, workflow orchestrator 122, and redundancy manager 206.

Computing device 500 includes one or more processor(s) 502, one or more memory device(s) 504, one or more interface(s) 506, one or more mass storage device(s) 508, one or more Input/output (I/O) device(s) 510, and a display device 530 all of which are coupled to a bus 512. Processor(s) 502 include one or more processors or controllers that execute instructions stored in memory device(s) 504 and/or mass storage device(s) 508. Processor(s) 502 may also include various types of computer-readable media, such as cache memory.

Memory device(s) 504 include various computer-readable media, such as volatile memory (e.g., random access memory (RAM) 514) and/or nonvolatile memory (e.g., read-only memory (ROM) 516). Memory device(s) 504 may also include rewritable ROM, such as Flash memory.

Mass storage device(s) 508 include various computer readable media, such as magnetic tapes, magnetic disks, optical disks, solid-state memory (e.g., Flash memory), and so forth. As shown in FIG. 5, a particular mass storage device is a hard disk drive 524. Various drives may also be included in mass storage device(s) 508 to enable reading from and/or writing to the various computer readable media. Mass storage device(s) 508 include removable media 526 and/or non-removable media.

I/O device(s) 510 include various devices that allow data and/or other information to be input to or retrieved from computing device 500. Example I/O device(s) 510 include cursor control devices, keyboards, keypads, microphones, monitors or other display devices, speakers, printers, network interface cards, modems, lenses, CCDs or other image capture devices, and the like.

Display device 530 includes any type of device capable of displaying information to one or more users of computing device 500. Examples of display device 530 include a monitor, display terminal, video projection device, and the like.

Interface(s) 506 include various interfaces that allow computing device 500 to interact with other systems, devices, or computing environments. Example interface(s) 506 include any number of different network interfaces 520, such as interfaces to local area networks (LANs), wide area networks (WANs), wireless networks, and the Internet. Other interface(s) include user interface 518 and peripheral device interface 522. The interface(s) 506 may also include one or more peripheral interfaces such as interfaces for printers, pointing devices (mice, track pad, etc.), keyboards, and the like.

Bus 512 allows processor(s) 502, memory device(s) 504, interface(s) 506, mass storage device(s) 508, I/O device(s) 510, and display device 530 to communicate with one another, as well as other devices or components coupled to bus 512. Bus 512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 500, and are executed by processor(s) 502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. An apparatus comprising:
  a plurality of computing devices each comprising one or more processing devices and one or more memory devices operably coupled to the one or more processing devices, the plurality of computing devices being configured to:
    implement a plurality of databases on a plurality of host computing devices of the plurality of computing devices;
    implement a redundancy manager configured to select a primary database from the plurality of databases with a remainder of the plurality of databases being secondary databases and manage failover upon failure of the primary database; and
    monitor the primary database independently from the redundancy manager and instruct the redundancy manager to preemptively failover to one of the secondary databases prior to failure of the primary database when a risk of failure is detected.

2. The apparatus of claim 1, wherein the plurality of computing devices are configured to monitor the primary database by monitoring loading of a host computing device of the plurality of host computing devices implementing the primary database.

3. The apparatus of claim 1, wherein the plurality of computing devices are configured to monitor the primary database by monitoring latency of a software component implementing the primary database.

4. The apparatus of claim 1, wherein the plurality of computing devices are configured to monitor the primary database by monitoring a temperature of one or more hardware components of a host computing device of the plurality of host computing devices implementing the primary database.

5. The apparatus of claim 4, wherein the one or more hardware components include the one or more processing devices of the host computing device of the plurality of host computing devices implementing the primary database.

6. The apparatus of claim 4, wherein the one or more hardware components include one or more storage devices of the host computing device of the plurality of host computing devices implementing the primary database.

7. The apparatus of claim 1, wherein the plurality of computing devices are configured to monitor trends in measured values for a host computing device of the plurality of host computing devices implementing the primary database.

8. The apparatus of claim 1, wherein the plurality of computing devices are configured to select the one of the secondary databases as having a least risk of failure of the secondary databases.

9. The apparatus of claim 1, wherein the redundancy manager is an instance of PATRONI.

10. The apparatus of claim 9, wherein the plurality of databases are POSTGRESQL databases.

11. A method comprising:
implementing a plurality of databases on at least a portion of a plurality of computing devices;
implementing, on the plurality of computing devices, a redundancy manager configured to select a primary database from the plurality of databases with a remainder of the plurality of databases being secondary databases and manage failover upon failure of the primary database;
monitoring, by an orchestrator executing on the plurality of computing devices, the primary database independently from the redundancy manager;
detecting, by the orchestrator, risk of failure of the primary database based on the monitoring of the primary database; and
in response to detecting the risk of failure, instructing, by the orchestrator, the redundancy manager to preemptively failover to one of the secondary databases prior to failure of the primary database.

12. The method of claim 11, further comprising monitoring, by the orchestrator, loading of a computing device of the plurality of computing devices hosting the primary database and instructing the redundancy manager to preemptively failover to the one of the secondary databases in response to the loading indicating a risk of failure.

13. The method of claim 11, further comprising monitoring, by the orchestrator, latency of a computing device of the plurality of computing devices hosting the primary database and instructing the redundancy manager to preemptively failover to the one of the secondary databases in response to the latency indicating a risk of failure.

14. The method of claim 11, further comprising monitoring, by the orchestrator, temperature of one or more hardware components of a computing device of the plurality of computing devices hosting the primary database and instructing the redundancy manager to preemptively failover to the one of the secondary databases in response to the temperature indicating a risk of failure.

15. The method of claim 14, wherein the one or more hardware components include one or more processing devices of the computing device of the plurality of computing devices hosting the primary database.

16. The method of claim 14, wherein the one or more hardware components include one or more storage devices of the computing device of the plurality of computing devices hosting the primary database.

17. The method of claim 11, further comprising monitoring, by the orchestrator, trends in measured values for a computing device of the plurality of computing devices hosting the primary database.

18. The method of claim 11, further comprising selecting the one of the secondary databases as having a least risk of failure of the secondary databases.

19. The method of claim 11, wherein the redundancy manager is an instance of PATRONI.

20. The method of claim 19, wherein the plurality of databases are POSTGRESQL databases.

* * * * *